United States Patent [19]

McDonald et al.

[11] Patent Number: 5,638,055

[45] Date of Patent: Jun. 10, 1997

[54] COMMUNICATION RESOURCE ALLOCATION BY INTERRUPT STATUS

[75] Inventors: Daniel J. McDonald, Cary; John A. Wolfe, Arlington Heights; Herbert R. Wolf, Elk Grove Village, all of Ill.

[73] Assignee: Motorola, Inc., Schaumburg, Ill.

[21] Appl. No.: 858,248

[22] Filed: Mar. 26, 1992

[51] Int. Cl.⁶ .................................................. H04Q 1/00
[52] U.S. Cl. ........................ 340/825.5; 340/825.51; 370/341; 455/58.2
[58] Field of Search .................. 340/825.5, 825.51, 340/825.03; 370/95.1; 379/37; 455/58.1, 58.2

[56] References Cited

U.S. PATENT DOCUMENTS

| | | |
|---|---|---|
| 3,764,981 | 10/1973 | Takasugi ............................ 340/825.51 |
| 4,012,597 | 3/1977 | Lynk, Jr. et al. . |
| 4,491,946 | 1/1985 | Kryskow ............................... 340/825.5 |
| 4,870,408 | 9/1989 | Zdunek et al. ...................... 340/825.03 |
| 5,025,254 | 6/1991 | Hess . |

Primary Examiner—Brian Zimmerman
Attorney, Agent, or Firm—Susan L. Lukasik

[57] ABSTRACT

Communication units organized into user groups are divided into user groups that distinguish whether a member of the user group may or may not interrupt active calls. Communications will not be interrupted (303) by units that are not allowed to interrupt active calls. Communications are interrupted (304) only by units that are allowed to interrupt active calls.

17 Claims, 3 Drawing Sheets

COMMUNICATION RESOURCE ALLOCATION BY INTERRUPT STATUS

FIELD OF THE INVENTION

This invention relates to communication systems, including but not limited to allocation of resources in trunked communication systems.

BACKGROUND OF THE INVENTION

Trunked communication systems are known to comprise a plurality of communication units, a limited number of communication resources that are transceived via a predetermined number of repeaters, or base stations, and a communication resource allocator that allocates the limited number of communication resources among the plurality of communication units. The communication resources may comprise a TDM bus, a carrier frequency, a pair of carrier frequencies, or any RF transmission means. Of the communication resources, one is selected as the control channel which transceives operational data between the communication resource allocator and the communication units. The communication units, which may be portable radios and/or mobile radios, are arranged into talk groups, also called user groups, by commonality of use. For example, a user group may comprise communication units that are operated by a police department while another user group comprises communication units operated by a fire department.

In a multi-site trunked communication system, the communication resources of one communication site may communicate to any other communication resource in any other communication site via an audio switch. Quite often in a dispatch call, more than one communication unit tries to transmit audio at the same time. Some systems determine which audio should be sourced based on signal quality. Other communication systems limit the communication users in the system to operate only in one type of audio sourcing mode, with very little control on a user group basis to determine which communication units are allowed to communicate at any one time. Thus, if a system manager needs to interrupt a call to deliver an important announcement, the manager must wait until the current communications are completed, even when the current call may be unduly long. The system manager needs to more flexibly determine call sourcing in the user groups in the system. Therefore, a more flexible method of allocation of resources is desired.

DESCRIPTION OF A PREFERRED EMBODIMENT

The following describes a method and apparatus that identifies members of user groups as interruptible or non-interruptible, and provides multiple modes of controlling which communication unit sources audio at any one time in a user group.

Figure 1:
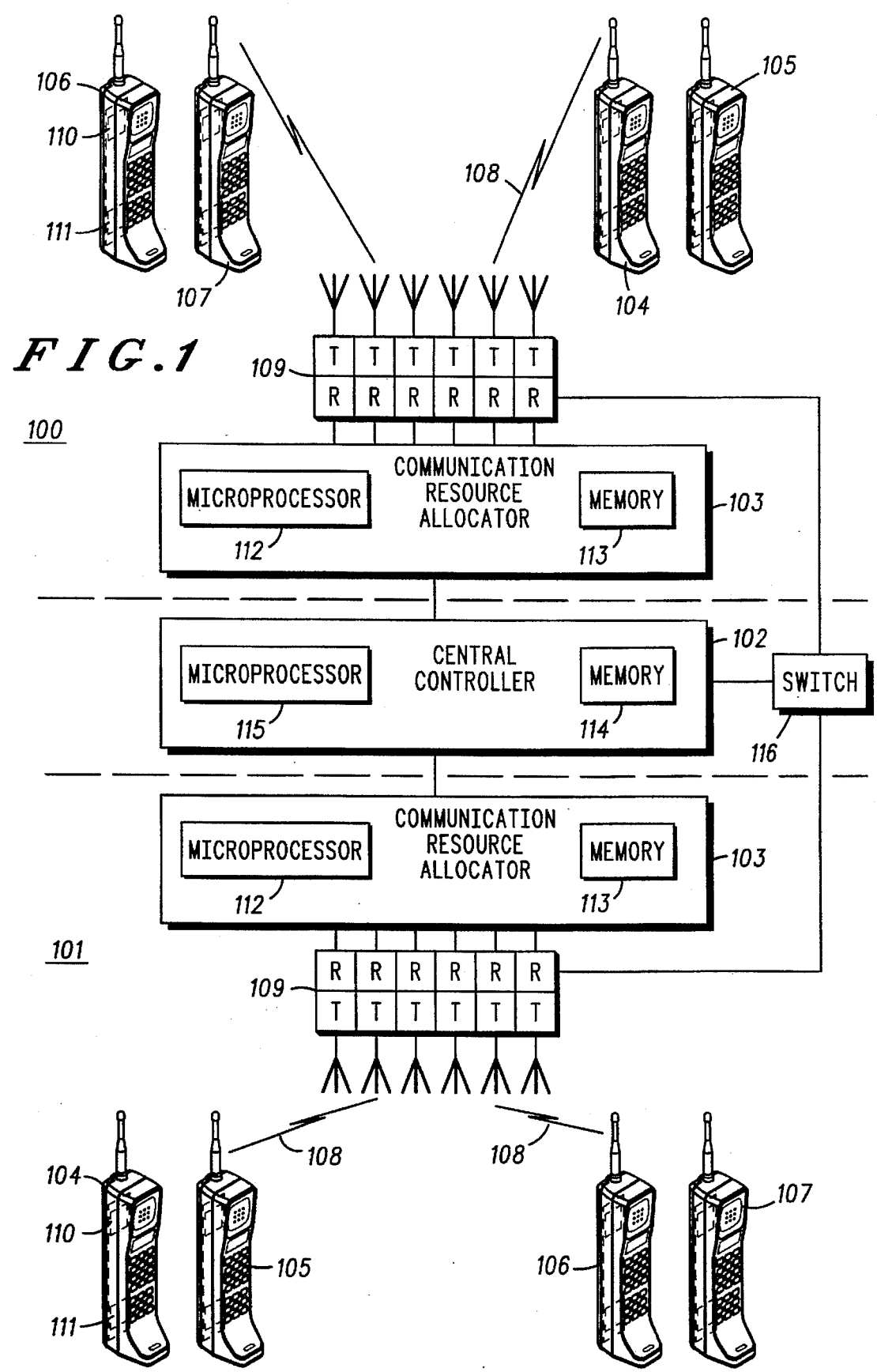
FIG. 1 illustrates a communication system in accordance with the invention.

FIG. 1 illustrates a trunked communication system including a plurality of communication sites 100 and 101 (only two shown) that are operably coupled via a central controller 102. Each communication site comprises a communication resource allocator 103, a plurality of communication units (only four shown) 104–107, a limited number of communication resources 108, and a limited number of repeaters, or base stations, 109.

Each communication resource allocator 103, which may be a Motorola remote central site controller, comprises at least one microprocessor 112, which may be a Motorola 6809 microprocessor, and a digital storage memory device 113 that may be RAM, ROM or any other type of means for storing digital information. Each of the communication resources 108 are transceived between the communication units 104–107 and the communication resource allocator 103 via the repeaters 109. One of the communication resources functions as a control channel that transceives trunked communication system control data between the communication resource allocator 103 and the communication units 104–107.

Each of the communication units 104–107, which may be a Motorola STX portable radio, comprises at least one microprocessor 110, which may be a Motorola 68HC11 microprocessor, and a digital storage memory device 111 that may be RAM, ROM or any other type of means for storing digital information. The communication unites 104–107 are configured into user groups, wherein two or more communication units form a user group.

In the communication system, a communication unit can operate in any of the communication sites of the network. This is generally accomplished by the communication resource allocator 103 of each communication site communicating with a hub computer network, or central controller 102, a technique that is well known in the art. The central controller 102 comprises at least one microprocessor 115, which may be a Motorola 68040 microprocessor, and a digital storage memory device 114 that may be RAM, ROM or any other type of means for storing digital information. The repeaters 109 in each communication site 100 and 101 are connected to a switch 116 which is under the control of the central controller 102. The switch 116 consists of a switch matrix or other means to route audio from one port to another as is known in the art.

Generally, the present invention provides a method that enables users of a communication system to control which communication unit sources audio at any one time in a user group. Three modes of operation are available and each mode is chosen on a group basis and applied to group communications. Upon receiving a request for a group communication service, the central controller 102 determines if the requested user group already has an active communication. If there is a communication active in the group, the central controller 102 determines whether this communication request should become the source of the active communication service based on the current audio source mode of the user group.

One of three audio source modes can be selected on a per user group basis. In a first mode of operation, a resource request is denied and the requesting communication unit 104 is not able to place a communication when a resource request is made by a communication unit 104 during an active communication. For example, a user group may be configured using the first audio source mode when the communication system manager decides that it is important for all communications to always be completed before any other communication takes place. This may occur when user group members provide reports while it is important that there is no interruption by other users.

In a second mode of operation, when the communication unit 104 requests a communication resource 108 during an active communication, the existing communication link is broken to accommodate this unit's 104 communication. A user group may be configured using the second audio source mode when the communication system manager decides that the system should operate similar to normal conversations. By operating in this manner, any user can interrupt and take control of the communication merely by requesting communication service. This mode of operation is similar to a normal conversation in which individuals routinely interrupt each other to take control of a conversation.

In a third mode of operation, if the communication unit 104 requesting a communication resource 108 during an active communication is determined to be of equal or greater priority than the communication unit 105 that is actively communicating in the user group, the existing communication link is broken to accommodate this unit's 104 communication. Also in the third mode, if the communication unit 104 requesting a communication resource 108 during an active communication is determined to be of lesser priority than the communication unit 105 that is actively communicating in the user group, the requesting communication unit 104 is denied service and not permitted to communicate during an active communication. A user group may be configured using the third audio source mode when the communication system manager decides that the system should have prioritization amongst the users when determining what individuals are allowed to control a communication. This mode of operation is useful when a supervisor of a user group wants to always be able to communicate with his user group, not allowing others of a lower priority to interrupt his communication while allowing the supervisor to interrupt others.

Communication within user groups is made possible by establishing communication routes through the communication switch 116 that is coupled to the repeaters 109 and the central controller 102, which controls the overall allocation of communication resources 108 amongst the plurality of communication units 104–107. The central controller 102 determines the audio source for a communication based on a per user group database setting.

Figure 2:
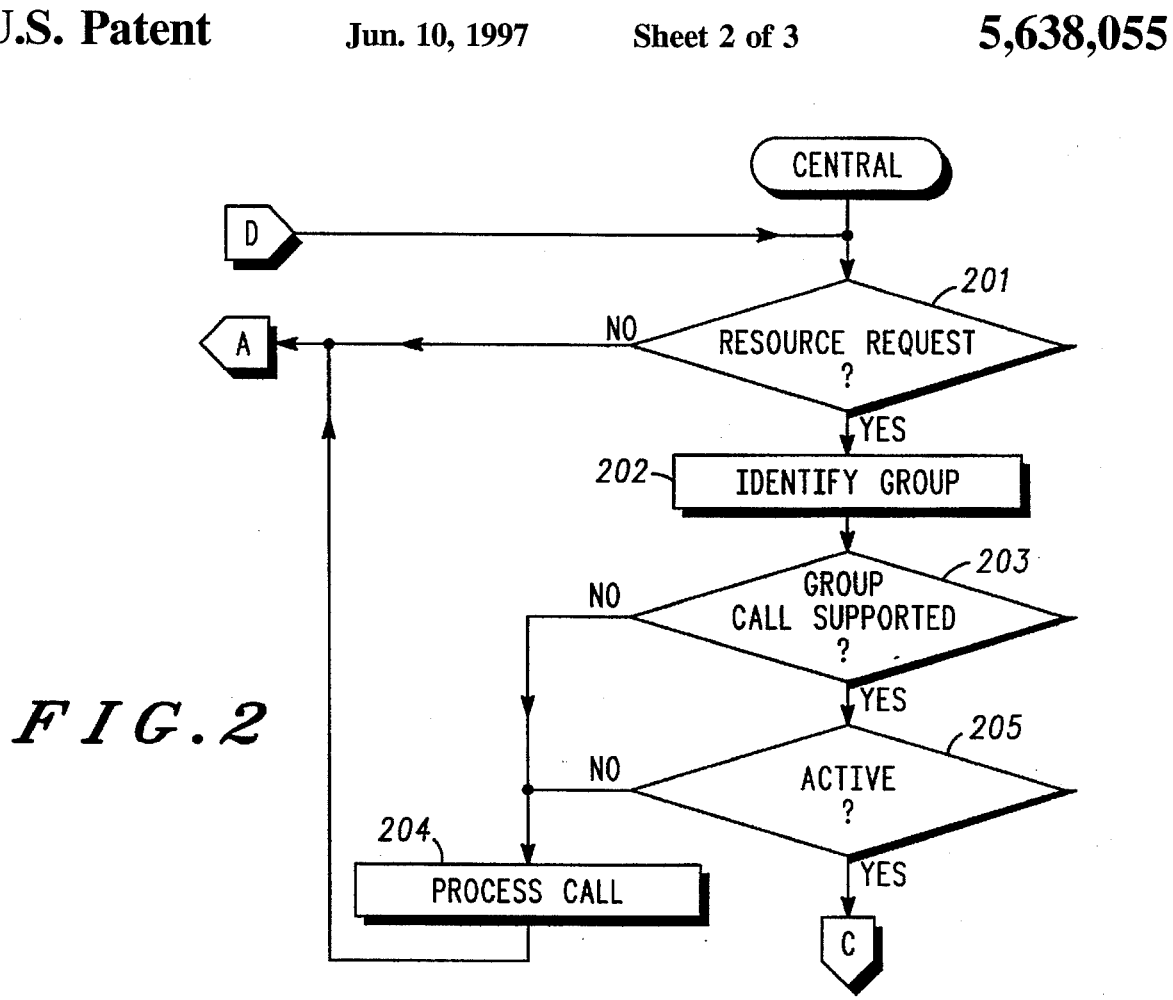
FIG. 2 is a flowchart showing group call identification in accordance with the invention.

The appropriate steps of the algorithm of FIG. 2 are programmed into the microprocessor 115 of the central controller 102, the microprocessors 112 of the communication resource allocators 103, and the communication switch 116. If at step 201 a resource request is not received by the central controller 102, the process continues with step 401 of FIG. 4 (described below in detail). If at step 201 the central controller 102 receives a resource request from a communication unit 104, the process continues with step 202. At step 202, the central controller 102 identifies the particular user group that the communication unit 104 specified for the pending communication.

At stop 203, the central controller 102 determines if the particular user group is currently supported in a group call (communication) by examining a database that relates communication activity to user groups. This database allows the central controller 102 to determine whether there is a call currently supported in the particular user group. If at step 203 the central controller 102 determines that there is no call currently supported in the particular user group, the central controller 102 processes the communication request at step 204 in a normal manner as is known in the art. If at step 203 there is a call currently supported in the particular user group, the central controller 102 determines at step 205 if there is also a communication unit actively communicating in the user group. The central controller 102 determines this by examining an internal database that tracks the current state of all active calls on the system. If at step 205 the central controller 102 determines that there is no communication unit actively communicating in the user group, the process continues with step 204. If there is a communication unit actively communicating in the user group, the process continues with step 301 of FIG. 3.

Figure 3:
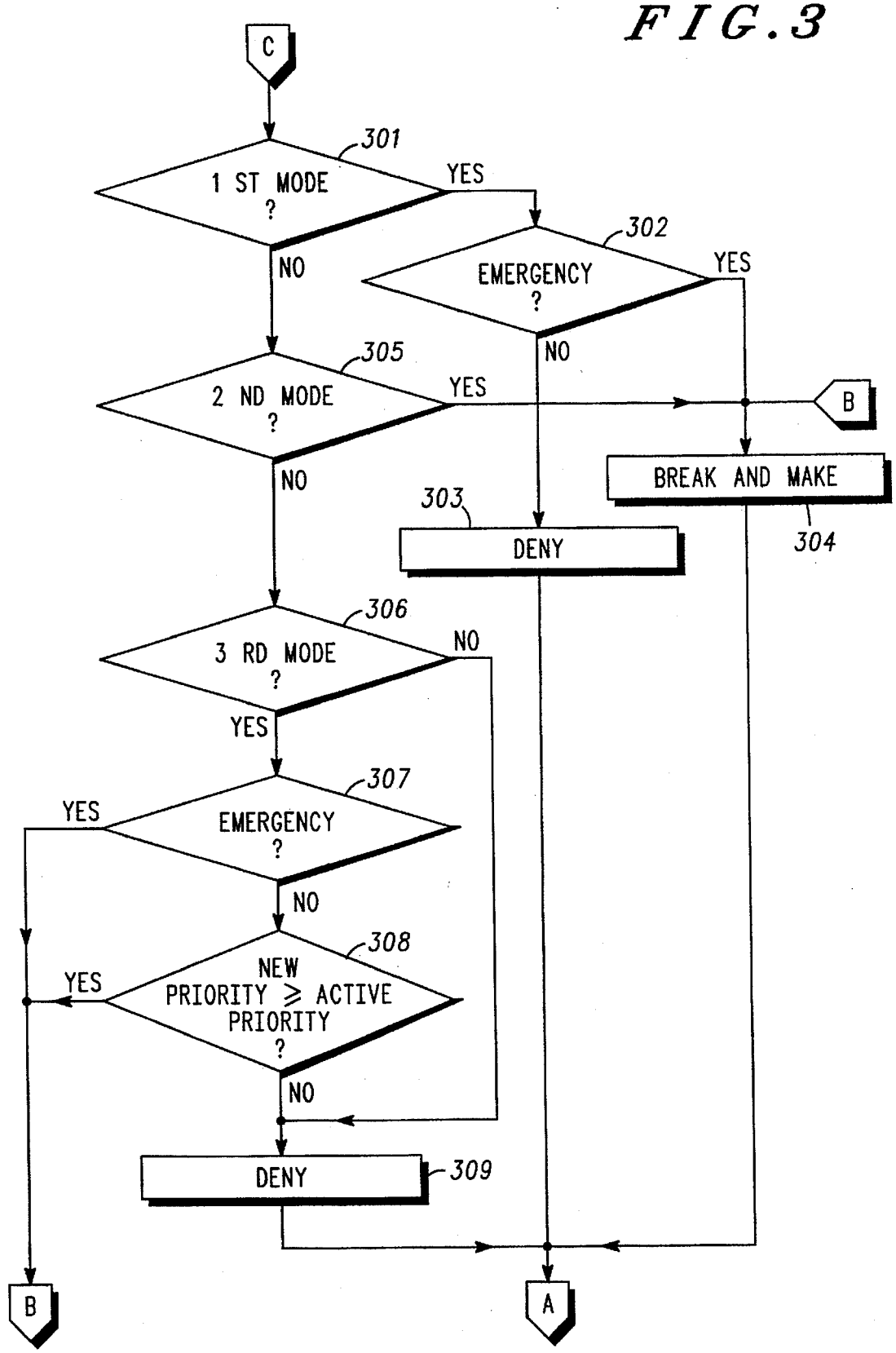
FIG. 3 is a flowchart showing resource allocation according to mode of operation in accordance with the invention.

In the steps of the flowchart of FIG. 3, the central controller 102 determines the audio source mode of operation for the user group. This information is obtained from a database present in the memory 114 of the central controller 102 and relates the user group to the audio source mode. Thus, the central controller 102 determines the audio source mode to apply based on the particular user group. If at step 301, the first audio source mode is selected, processing continues with step 302. At step 302, the central controller 102 determines if the resource request is an emergency request. If the request is not an emergency request at step 302, then the process continues with step 303, where the central controller 102 denies the resource request, thus preventing the interruption of the already established communication route by a non-emergency call in the same user group, and the process continues with step 401 of FIG. 4. If the resource request is an emergency request at step 302, the emergency request is permitted to interrupt the already established communication route, causing the existing communication route to be broken, and a new communication route to be established (made), thereby configuring the emergency request as the communication source of the group call at step 304, and the process continues with step 401 of FIG. 4.

If at step 301 the first mode of audio sourcing is not selected, the process continues with step 305. At step 305, the central controller 102 determines if the audio source mode is selected as the second mode, based on the previously described database that relates the user group to the audio source mode. If the second audio source mode is selected for this particular user group, the process continues with step 304, where the resource request is permitted to interrupt the already established communication route, causing the existing communication route to be broken, and a new communication route to be established (made), thereby configuring this communication unit as the source of the group call, and the process continues with step 401 of FIG. 4.

If at step 305 the second mode of audio sourcing is not selected, the process continues with step 306. At step 306, the central controller 102 determines if the third audio source mode is selected for the requested user group. If the third audio source mode is not selected at step 306, the process continues with step 309, where the resource request is denied, preventing the interruption of the already established communication route.

If the third mode of audio source operation is selected at step 306, the central controller 102 determines if the resource request is an emergency request at step 307. If the resource request is an emergency request at step 307, the process continues with step 304, where the emergency request is permitted to interrupt the already established communication route, causing the existing communication route to be broken, and a new communication route to be established (made), thereby configuring the emergency request as the communication source of the group call, and the process continues with step 401 of FIG. 4.

If the resource request is not an emergency request at step 307, the process continues with step 308, where the central controller 102 determines the pre-assigned priority level of the currently sourcing communication unit and the requesting communication unit, based on an internal database that relates communication unit identification to pre-established priority levels. At step 308, the central controller 102 also determines if the requesting communication unit's pre-assigned priority level meets a predetermined criteria for interrupting a sourced communication. The predetermined criteria may be that the requesting communication unit's pre-assigned priority must be equal to or greater than the pre-assigned priority of the communication unit that is currently sourcing the communication on the user group.

Figure 4:
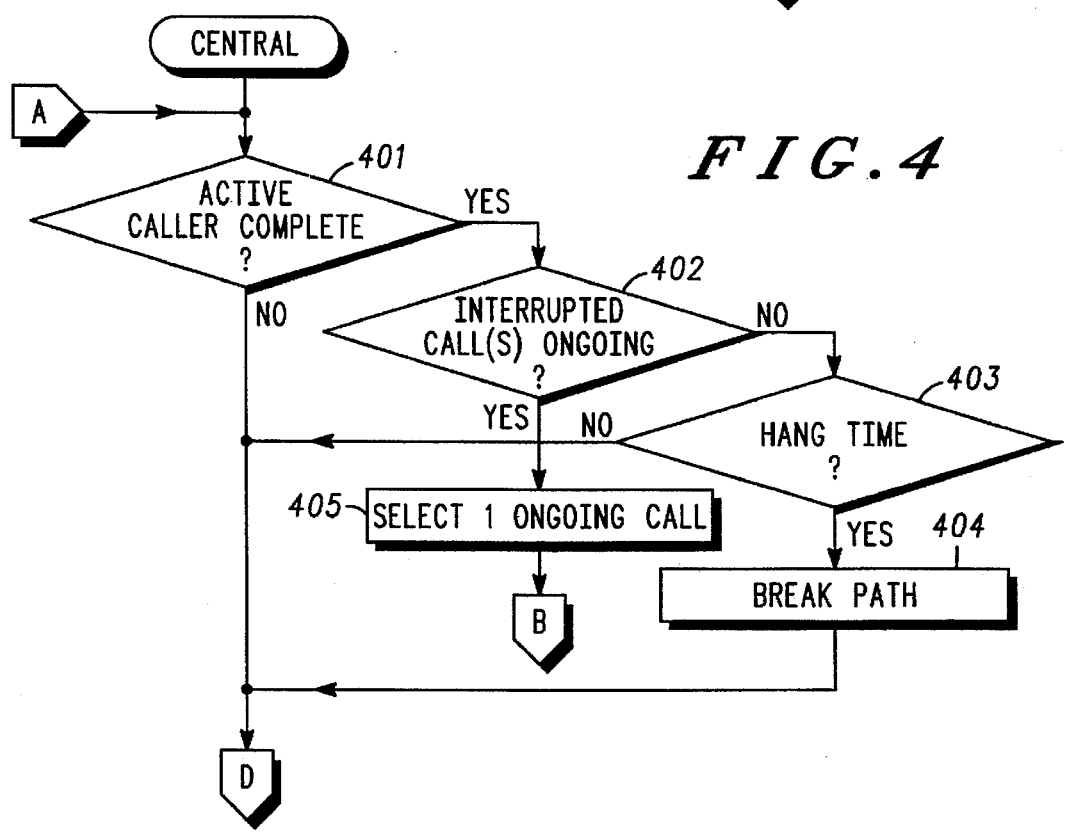
FIG. 4 is a flowchart showing resource reallocation to an interrupted call in accordance with the invention.

If at step 308 the central controller 102 determines that the requesting communication unit does not meet the predetermined criteria, the central controller 102 denies the resource request at step 309, thus preventing the interruption of the already established communication route by a non-emergency call in the same user group, and the process continues with step 401 of FIG. 4. If at step 308 the central controller 102 determines that the requesting communication unit does meet the predetermined criteria, the process continues with step 304, where the resource request is permitted to interrupt the already established communication route, causing the existing communication route to be broken, and a new communication route to be established (made), thereby configuring this communication unit as the source of the group call, and the process continues with step 401 of FIG. 4.

In the steps of the flowchart of FIG. 4, the central controller 102 determines if the current source of a communication is still sourcing the group call, based on an internal database that keeps track of the current state of active communications. If at step 401 the current source of the communication (the active caller) is still sourcing the communication in the user group, the process continues with step 201 of FIG. 2. If at step 401 the current source of the communication has completed sourcing the communication, the process continues with step 402.

At step 402, the central controller 102 determines if an interrupted communication is still ongoing. An example of this situation occurs when the second audio mode is selected for the user group and one or more communications have been interrupted, but at least one of these communications is still ongoing. If at step 402 at least one interrupted communication is still ongoing, the process continues with step 405. At step 405, the central controller 102 selects one of the ongoing interrupted communications pursuant to a selection criteria. This selection criteria may take into account several factors, such as the last communication site to source the communication before being interrupted or a pre-established site priority that determines which site receives priority when reinstating service for ongoing communications. Once an ongoing communication is determined, the process continues with step 304 of FIG. 3, at which point the central controller 102 establishes a new communication route to accommodate the ongoing communication as previously described.

If at step 402 there is no interrupted call still ongoing, the central controller 102 determines if the call is still in the talkback time, or hang time. If the call is still in the hang time state, the process continues with step 201 of FIG. 2. If the hang time is concluded at step 403, this particular group's communication service is considered complete, and the central controller 102 breaks the established communication route at step 404, and the process continues with step 201 of FIG. 2.

By implementation of this invention, several important benefits result. Most importantly, the present invention supplies a flexible mechanism for audio communication sourcing, thus providing system operators with the ability to select two, or even three, different modes of operation for different user groups to determine what audio source will be supplied for active communications.

What is claimed is:

1. A method of controlling allocation of communication resources amongst a plurality of communication sources, which communication sources are organized into a plurality of user groups, comprising the steps of:

A) providing at least a first mode of operation and a second mode of operation;

B) when operating in the first mode of operation with respect to a first communication in the form of a group call sourced within a first user group, preventing interruption of the first communication by another member of the first user group; and C) when operating in the second mode of operation with respect to a second communication sourced within a second user group, allowing a non-emergency interruption of the first communication by any member of the second user group.

2. A method of controlling allocation of communication resources amongst a plurality of communication sources, which communication sources are organized into a plurality of user groups, comprising the steps of:

A) providing at least a first mode of operation and a second mode of operation;

B) when operating in the first mode of operation with respect to a first communication sourced within a first user group, preventing interruption of the first communication by another member of the first user group unless the member is making an emergency call; and C) when operating in the second mode of operation with respect to a second communication sourced within a second user group, allowing a non-emergency interruption of the first communication by any member of the second user group.

3. The method of claim 1, wherein at least one user group includes users having varying communication pre-assigned priorities with respect to one another, and further including the steps of:

D) providing a third mode of operation; and

E) when operating in the third mode of operation with respect to a third communication sourced within the at least one user group, allowing non-emergency interruption of the third communication by any member of the at least one user group having a pre-assigned priority that meets a predetermined criteria.

4. The method of claim 3, wherein the predetermined criteria requires that the pre-assigned priority of a potentially interrupting user be at least equal to the preassigned priority of a user sourcing the third communication.

5. The method of claim 2, wherein at least one user group includes users having varying communication pre-assigned priorities with respect to one another, and further including the steps of:

D) providing a third mode of operation; and

E) when operating in the third mode of operation with respect to a third communication sourced within the at least one user group, allowing non-emergency interruption of the third communication by any member of the at least one user group having a pre-assigned priority that meets a predetermined criteria.

6. A method of controlling allocation of communication resources amongst a plurality of communication sources, which communication sources are organized into a plurality of user groups, wherein at least one user group includes users having varying communication pre-assigned priorities with respect to one another, comprising the steps of:

A) providing at least a first mode of operation, a second mode of operation, and a third mode of operation;

B) when operating in the first mode of operation with respect to a first communication in the form of a group call sourced within a first user group, preventing non-emergency interruption of the first communication by another member of the first user group;

C) when operating in the second mode of operation with respect to a second communication sourced within a second user group, allowing a non-emergency interruption of the first communication by any member of the second user group; and D) when operating in the third mode of operation with respect to a third communication sourced within the at least one user group, allowing non-emergency interruption of the third communication by any member of the at least one user group having a pre-assigned priority that meets a predetermined criteria.

7. A method of controlling allocation of communication resources amongst a plurality of communication sources in a communication system, which communication system includes:

a central controller for controlling overall allocation of communication resources within the communication system;

a plurality of sites, wherein each site includes:
at least one repeater;
control means coupled to the central controller and to the at least one repeater for controlling operation of the at least one repeater;

a communication switch operably coupled to the repeaters of the plurality of sites, and further being coupled to the central controller, wherein the communication sources are organized into a plurality of user groups, comprising the steps of:

A) providing at least a first mode of operation and a second mode of operation;

B) when operating in the first mode of operation with respect to a first communication sourced in the form of a group call within a first user group, maintaining an already established communication route through the communication switch notwithstanding an attempted interruption of the first communication by another member of the first user group; and C) when operating in the second mode of operation with respect to a second communication sourced within a second user group, breaking an already established communication route through the communication switch and establish a new communication route through the communication switch to accommodate a non-emergency interruption of the first communication by any member of the second user group.

8. A method of controlling allocation of communication resources amongst a plurality of communication sources in a communication system, which communication system includes:

a central controller for controlling overall allocation of communication resources within the communication system;

plurality of sites, wherein each site includes:
at least one repeater;
control means coupled to the central controller and to the at least one repeater for controlling operation of the at least one repeater;

a communication switch operably coupled to the repeaters of the plurality of sites, and further being coupled to the central controller, wherein the communication sources are organized into a plurality of user groups, comprising the steps of:

A) providing at least a first mode of operation and a second mode of operation;

B) when operating in the first mode of operation with respect to a first communication sourced within a first user group, maintaining an already established communication route through the communication switch notwithstanding an attempted interruption of the first communication by another member of the first user group unless the member is making an emergency call; and C) when operating in the second mode of operation with respect to a second communication sourced within a second user group, breaking an already established communication route through the communication switch and establish a new communication route through the communication switch to accommodate a non-emergency interruption of the first communication by any member of the second user group.

9. The method of claim 7, wherein at least one user group includes users having varying communication pre-assigned priorities with respect to one another, and further including the steps of:

D) providing a third mode of operation; and

E) when operating in the third mode of operation with respect to a third communication sourced within the at least one user group, breaking an already established communication route through the communication switch and establishing a new communication route through the communication switch to accommodate a non-emergency interruption of the third communication by any member of the at least one user group having a pre-assigned priority that meets a predetermined criteria.

10. The method of claim 9, wherein the predetermined criteria requires that the pre-assigned priority of a potentially interrupting user be at least equal to the preassigned priority of a user sourcing the third communication.

11. The method of claim 8, wherein at least one user group includes users having varying communication pre-assigned priorities with respect to one another, and further including the steps of:

D) providing a third mode of operation; and

E) when operating in the third mode of operation with respect to a third communication sourced within the at least one user group, breaking an already established communication route through the communication switch and establishing a new communication route through the communication switch to accommodate a non-emergency interruption of the third communication by any member of the at least one user group having a pre-assigned priority that meets a predetermined criteria.

12. The method of claim 7, and further including the step of:

C1) when the non-emergency interruption concludes, and the second communication is still ongoing, establishing a new communication route through the communication switch to accommodate the ongoing second communication.

13. The method of claim 12, and further including the step of:

C2) when a plurality of communications have been previously interrupted, and when a plurality of such previously interrupted communications are still ongoing when a last accommodated interrupting communication has concluded, selecting one of the plurality of such ongoing previously interrupted communications pursuant to a selection criteria, and establishing a new communication route through the communication switch to accommodate the ongoing selected communication.

14. The method of claim 9, and further including the step of:

E1) when the non-emergency interruption of the third communication concludes, and the third communication is still ongoing, establishing a new communication route through the communication switch to accommodate the ongoing third communication.

15. The method of claim 14, and further including the step of:

E2) when a plurality of communications have been previously interrupted, and when a plurality of such previously interrupted communications are still ongoing when a last accommodated interrupting communication has concluded, selecting one of the plurality of such ongoing previously interrupted communications pursuant to a selection criteria, and establishing a new communication route through the communication switch to accommodate the ongoing selected communication.

16. The method of claim 5, wherein the predetermined criteria requires that the pre-assigned priority of a potentially interrupting user be at least equal to the preassigned priority of a user sourcing the third communication.

17. The method of claim 11, wherein the predetermined criteria requires that the pre-assigned priority of a potentially interrupting user be at least equal to the preassigned priority of a user sourcing the third communication.

* * * * *

UNITED STATES PATENT AND TRADEMARK OFFICE
CERTIFICATE OF CORRECTION

PATENT NO. : 5,638,055
DATED : June 10, 1997
INVENTOR(S) : McDonald, Daniel J. et al.

It is certified that error appears in the above-indentified patent and that said Letters Patent is hereby corrected as shown below:

In column 7, line 67, before the word "plurality" please insert the word --a--.

Signed and Sealed this

Fourteenth Day of October, 1997

Attest:

BRUCE LEHMAN

Attesting Officer

Commissioner of Patents and Trademarks